United States Patent
Wang et al.

(10) Patent No.: US 9,718,258 B2
(45) Date of Patent: Aug. 1, 2017

(54) MULTI-LAYERED FILM CONTAINING A BIOPOLYMER

(75) Inventors: James H. Wang, Appleton, WI (US); Gregory J. Wideman, Menasha, WI (US); Brent M. Thompson, Oshkosh, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 203 days.

(21) Appl. No.: 13/330,820

(22) Filed: Dec. 20, 2011

(65) Prior Publication Data

US 2013/0157032 A1 Jun. 20, 2013

(51) Int. Cl.
*B32B 27/32* (2006.01)
*B32B 27/08* (2006.01)
*B32B 27/36* (2006.01)

(52) U.S. Cl.
CPC .............. *B32B 27/08* (2013.01); *B32B 27/32* (2013.01); *B32B 27/36* (2013.01); *B32B 2250/02* (2013.01); *B32B 2250/03* (2013.01); *B32B 2250/24* (2013.01); *B32B 2270/00* (2013.01); *B32B 2307/7163* (2013.01); *B32B 2439/70* (2013.01)

(58) Field of Classification Search
CPC ......... B32B 27/08; B32B 27/32; B32B 27/36; B32B 2250/02; B32B 2250/03; B32B 2250/24; B32B 2270/00; B32B 2307/7163
USPC ............................ 428/212, 411.1; 525/63, 64
See application file for complete search history.

(56) References Cited

U.S. PATENT DOCUMENTS

| | | |
|---|---|---|
| 3,071,485 A | 1/1963 | Wurzburg et al. |
| 3,243,308 A | 3/1966 | Barger et al. |
| 3,354,506 A | 11/1967 | Raley |
| 3,575,173 A | 4/1971 | Loyer |
| 3,650,649 A | 3/1972 | Schippers |
| 3,801,429 A | 4/1974 | Schrenk et al. |
| 4,333,464 A | 6/1982 | Nakano |
| 4,337,181 A | 6/1982 | Otey et al. |
| 4,499,154 A | 2/1985 | James et al. |
| 4,503,098 A | 3/1985 | Potts |
| 4,789,699 A | 12/1988 | Kieffer et al. |
| 4,798,603 A | 1/1989 | Meyer et al. |
| 4,801,494 A | 1/1989 | Datta et al. |
| 4,886,512 A | 12/1989 | Damico et al. |
| 4,908,026 A | 3/1990 | Sukiennik et al. |
| 4,937,299 A | 6/1990 | Ewen et al. |
| 4,964,857 A | 10/1990 | Osborn |
| 5,073,455 A | 12/1991 | Nose et al. |
| 5,095,054 A | 3/1992 | Lay et al. |
| 5,106,890 A | 4/1992 | Maruhashi et al. |
| 5,179,164 A | 1/1993 | Lausberg et al. |
| 5,196,247 A | 3/1993 | Wu et al. |
| 5,217,803 A | 6/1993 | McBride et al. |
| 5,218,071 A | 6/1993 | Tsutsui et al. |
| 5,219,646 A | 6/1993 | Gallagher et al. |
| 5,242,102 A | 9/1993 | Nicolas |
| 5,248,309 A | 9/1993 | Serbiak et al. |
| 5,254,607 A | 10/1993 | McBride et al. |
| 5,272,236 A | 12/1993 | Lai et al. |
| 5,278,272 A | 1/1994 | Lai et al. |
| 5,292,783 A | 3/1994 | Buchanan et al. |
| 5,300,358 A | 4/1994 | Evers |
| 5,314,754 A | 5/1994 | Knight |
| 5,322,728 A | 6/1994 | Davey et al. |
| 5,346,936 A | 9/1994 | Buehler et al. |
| 5,350,354 A | 9/1994 | Billmers |
| 5,405,564 A | 4/1995 | Stepto et al. |
| 5,412,005 A | 5/1995 | Bastioli et al. |
| 5,415,643 A | 5/1995 | Kolb |
| 5,416,181 A | 5/1995 | Nguyen et al. |
| 5,436,078 A | 7/1995 | Bühler et al. |
| 5,446,079 A | 8/1995 | Buchanan et al. |
| 5,452,981 A | 9/1995 | Crorey et al. |
| 5,461,094 A | 10/1995 | Yoo et al. |

(Continued)

FOREIGN PATENT DOCUMENTS

EP 0 327 505 A2 8/1989
EP 0 327 505 A3 8/1989

(Continued)

OTHER PUBLICATIONS

Abstract of German Patent—DE19802718 A1, Jul. 29, 1999, 2 pages.

(Continued)

*Primary Examiner* — Aaron Austin
*Assistant Examiner* — Lawrence Ferguson
(74) *Attorney, Agent, or Firm* — Dority & Manning, P.A.

(57) ABSTRACT

A film that contains a core layer positioned adjacent to an outer layer is provided. The core layer contains a relatively high percentage of thermoplastic biopolymers that are both biodegradable and renewable. Despite being biodegradable and renewable, many biopolymers tend to be relatively stiff in nature. The present inventors have discovered, however, that through selective control over the components in the core and outer layers, a film can be readily formed having good mechanical properties. Among other things, this is accomplished by blending the biopolymer in the core layer with a polyolefin. A polyolefin is also employed in the outer layer. In addition to providing functionality to the film (e.g., heat sealing, printing, etc.), the polyolefin-containing outer layer also helps counteract the stiffness of the biopolymer in the core layer, and helps improve processability, stiffness, and ductility.

17 Claims, 1 Drawing Sheet

(56) References Cited

U.S. PATENT DOCUMENTS

| | | |
|---|---|---|
| 5,462,981 A | 10/1995 | Bastioli et al. |
| 5,472,775 A | 12/1995 | Obijeski et al. |
| 5,496,895 A | 3/1996 | Chinnaswamy et al. |
| 5,506,277 A | 4/1996 | Griesbach et al. |
| 5,509,913 A | 4/1996 | Yeo |
| 5,510,401 A | 4/1996 | Dehennau et al. |
| 5,525,281 A | 6/1996 | Lörcks et al. |
| 5,539,056 A | 7/1996 | Yang et al. |
| 5,558,659 A | 9/1996 | Sherrod et al. |
| 5,559,171 A | 9/1996 | Buchanan et al. |
| 5,565,509 A | 10/1996 | Nguyen et al. |
| 5,571,619 A | 11/1996 | McAlpin et al. |
| 5,580,911 A | 12/1996 | Buchanan et al. |
| 5,596,052 A | 1/1997 | Resconi et al. |
| 5,599,293 A | 2/1997 | Orenga et al. |
| 5,599,858 A | 2/1997 | Buchanan et al. |
| 5,635,550 A | 6/1997 | Dehennau et al. |
| 5,649,916 A | 7/1997 | DiPalma et al. |
| 5,662,731 A | 9/1997 | Andersen et al. |
| 5,665,786 A | 9/1997 | Xu et al. |
| 5,679,145 A | 10/1997 | Andersen et al. |
| 5,681,299 A | 10/1997 | Brown |
| 5,695,868 A | 12/1997 | McCormack |
| 5,696,186 A | 12/1997 | Videau |
| 5,700,553 A | 12/1997 | Cohen et al. |
| 5,722,966 A | 3/1998 | Christon et al. |
| 5,759,569 A | 6/1998 | Hird et al. |
| 5,817,721 A | 10/1998 | Warzelhan et al. |
| 5,823,988 A | 10/1998 | Orenga et al. |
| 5,848,309 A | 12/1998 | Shimizu |
| 5,861,461 A | 1/1999 | Lee et al. |
| 5,873,871 A | 2/1999 | Lavash et al. |
| 5,900,322 A | 5/1999 | Buchanan et al. |
| 5,916,678 A | 6/1999 | Jackson et al. |
| 5,916,969 A | 6/1999 | Wang et al. |
| 5,932,497 A | 8/1999 | Morman et al. |
| 5,945,480 A | 8/1999 | Wang et al. |
| 5,948,710 A | 9/1999 | Pomplun et al. |
| 5,981,012 A | 11/1999 | Pomplun et al. |
| 5,985,396 A | 11/1999 | Kerins et al. |
| 5,997,981 A | 12/1999 | McCormack et al. |
| 6,011,092 A | 1/2000 | Seppälä et al. |
| 6,015,764 A | 1/2000 | McCormack et al. |
| 6,075,118 A | 6/2000 | Wang et al. |
| 6,075,179 A | 6/2000 | McCormack et al. |
| 6,090,325 A | 7/2000 | Wheat et al. |
| 6,096,809 A | 8/2000 | Lorcks et al. |
| 6,110,158 A | 8/2000 | Kielpikowski |
| 6,111,163 A | 8/2000 | McCormack et al. |
| 6,160,199 A | 12/2000 | Noda |
| 6,174,990 B1 | 1/2001 | Noda |
| 6,214,907 B1 | 4/2001 | Tomka |
| 6,231,970 B1 | 5/2001 | Andersen et al. |
| 6,235,815 B1 | 5/2001 | Loercks et al. |
| 6,235,816 B1 | 5/2001 | Lorcks et al. |
| 6,242,102 B1 | 6/2001 | Tomka |
| 6,258,427 B1 | 7/2001 | Kerins et al. |
| 6,258,924 B1 | 7/2001 | Warzelhan et al. |
| 6,288,184 B1 | 9/2001 | Wilson, Jr. et al. |
| 6,294,238 B1 | 9/2001 | Pomplun et al. |
| 6,296,914 B1 | 10/2001 | Kerins et al. |
| 6,309,736 B1 | 10/2001 | McCormack et al. |
| 6,312,756 B1 | 11/2001 | Dudacek et al. |
| 6,323,265 B1 | 11/2001 | Bengs et al. |
| 6,348,524 B2 | 2/2002 | Bastioli et al. |
| 6,380,445 B1 | 4/2002 | Rietz et al. |
| 6,387,528 B1 | 5/2002 | Pomplun et al. |
| 6,436,498 B1 | 8/2002 | Rangwalla et al. |
| 6,461,457 B1 | 10/2002 | Taylor et al. |
| 6,472,497 B2 | 10/2002 | Loercks et al. |
| 6,479,105 B2 | 11/2002 | Chang et al. |
| 6,489,533 B2 | 12/2002 | Imai et al. |
| 6,495,080 B1 | 12/2002 | Tsai et al. |
| 6,500,563 B1 | 12/2002 | Datta et al. |
| 6,511,465 B1 | 1/2003 | Freiburger et al. |
| 6,514,602 B1 | 2/2003 | Zhao et al. |
| 6,515,054 B1 | 2/2003 | Matsushita et al. |
| 6,530,910 B1 | 3/2003 | Pomplun et al. |
| 6,531,642 B2 | 3/2003 | Kurata et al. |
| 6,534,610 B1 | 3/2003 | Wilson, Jr. et al. |
| 6,563,399 B2 | 5/2003 | Love |
| 6,564,399 B2 | 5/2003 | Teal |
| 6,573,340 B1 | 6/2003 | Khemani et al. |
| 6,605,657 B1 | 8/2003 | Favis et al. |
| 6,607,819 B2 | 8/2003 | Wang et al. |
| 6,616,787 B2 | 9/2003 | Imai et al. |
| 6,638,603 B1 | 10/2003 | Kerins et al. |
| 6,663,611 B2 | 12/2003 | Blaney et al. |
| 6,716,203 B2 | 4/2004 | Sorebo et al. |
| 6,747,186 B2 | 6/2004 | Shimizu |
| 6,783,826 B2 | 8/2004 | Sherrod et al. |
| 6,824,734 B2 | 11/2004 | Boggs et al. |
| 6,844,380 B2 | 1/2005 | Favis et al. |
| 6,888,044 B2 | 5/2005 | Fell et al. |
| 6,890,872 B2 | 5/2005 | Bond et al. |
| 6,897,168 B2 | 5/2005 | Branham et al. |
| 6,908,966 B2 | 6/2005 | Chang et al. |
| 6,946,506 B2 | 9/2005 | Bond et al. |
| 6,958,371 B1 | 10/2005 | Wang et al. |
| 6,960,371 B2 | 11/2005 | Bunyard et al. |
| 6,994,865 B2 | 2/2006 | Branham et al. |
| 7,012,116 B1 | 3/2006 | Schertz et al. |
| 7,025,908 B1 | 4/2006 | Hayashi et al. |
| 7,077,994 B2 | 7/2006 | Bond et al. |
| 7,094,817 B2 | 8/2006 | Halley |
| 7,098,292 B2 | 8/2006 | Zhao et al. |
| 7,176,251 B1 | 2/2007 | Bastioli et al. |
| 7,176,349 B1 | 2/2007 | Dhugga et al. |
| 7,179,245 B2 | 2/2007 | Giori |
| 7,208,535 B2 | 4/2007 | Asrar et al. |
| 7,214,414 B2 | 5/2007 | Khemani et al. |
| 7,267,794 B2 | 9/2007 | Amick |
| 7,276,361 B2 | 10/2007 | Doi et al. |
| 7,297,394 B2 | 11/2007 | Khemani et al. |
| 7,368,503 B2 | 5/2008 | Hale |
| 7,517,339 B2 | 4/2009 | Pedersen et al. |
| 7,608,649 B2 | 10/2009 | Sun et al. |
| 7,629,405 B2 | 12/2009 | Narayan et al. |
| 7,678,444 B2 | 3/2010 | Tedford, Jr. et al. |
| 7,740,952 B2 | 6/2010 | Hausmann et al. |
| 7,842,761 B2 | 11/2010 | Flynn et al. |
| 7,854,994 B2 | 12/2010 | Henderson-Rutgers et al. |
| 7,901,764 B2 * | 3/2011 | Takase et al. ............ 428/314.8 |
| 7,902,094 B2 | 3/2011 | Haile et al. |
| 7,951,436 B2 | 5/2011 | Knoerzer et al. |
| 7,951,438 B2 | 5/2011 | Lee et al. |
| 7,998,888 B2 | 8/2011 | Shi et al. |
| 8,114,522 B2 * | 2/2012 | Kitora et al. ............... 428/483 |
| 8,188,185 B2 | 5/2012 | Wang et al. |
| 8,226,622 B2 | 7/2012 | Mitchler et al. |
| 8,296,114 B2 | 10/2012 | Prasad et al. |
| 8,329,977 B2 | 12/2012 | Wang et al. |
| 2002/0028857 A1 | 3/2002 | Holy |
| 2002/0094444 A1 | 7/2002 | Nakata et al. |
| 2002/0111596 A1 | 8/2002 | Fletcher et al. |
| 2003/0116462 A1 | 6/2003 | Sorebo et al. |
| 2004/0060112 A1 | 4/2004 | Fell et al. |
| 2004/0267217 A1 | 12/2004 | Dave et al. |
| 2005/0245162 A1 | 11/2005 | McCormack et al. |
| 2005/0258567 A1 | 11/2005 | Wang |
| 2005/0282456 A1 | 12/2005 | Zhao et al. |
| 2006/0068200 A1 | 3/2006 | Cleckner et al. |
| 2007/0042207 A1 | 2/2007 | Berger et al. |
| 2007/0241483 A1 | 10/2007 | Bastioli et al. |
| 2007/0264460 A1 | 11/2007 | Del Tredici |
| 2008/0033093 A1 | 2/2008 | Menceloglu et al. |
| 2008/0182113 A1 * | 7/2008 | Hausmann et al. ......... 428/458 |
| 2008/0287592 A1 | 11/2008 | Favis et al. |
| 2009/0017240 A1 | 1/2009 | Charbonnel et al. |
| 2009/0048368 A1 * | 2/2009 | Bash et al. .................. 523/122 |
| 2009/0286090 A1 | 11/2009 | Ting et al. |
| 2010/0272940 A1 | 10/2010 | Shi et al. |
| 2010/0305271 A1 | 12/2010 | Mentink et al. |
| 2012/0009387 A1 | 1/2012 | Wang et al. |

(56) References Cited

U.S. PATENT DOCUMENTS

| | | |
|---|---|---|
| 2012/0315416 A1 | 12/2012 | Chen et al. |
| 2012/0315454 A1 | 12/2012 | Wang et al. |
| 2013/0011593 A1 | 1/2013 | Wang et al. |
| 2013/0046262 A1 | 2/2013 | Wang et al. |

FOREIGN PATENT DOCUMENTS

| | | |
|---|---|---|
| EP | 0 417 828 A1 | 3/1991 |
| EP | 0 809 680 B1 | 12/1997 |
| EP | 0 947 559 B1 | 10/1999 |
| EP | 1 116 748 A1 | 7/2001 |
| JP | 4726989 B2 | 7/2011 |
| WO | WO 92/02199 A1 | 2/1992 |
| WO | WO 96/20831 A1 | 7/1996 |
| WO | WO 97/06925 A1 | 2/1997 |
| WO | WO 98/36018 A1 | 8/1998 |
| WO | WO 2005/011956 A2 | 2/2005 |
| WO | WO 2005/011956 A3 | 2/2005 |
| WO | WO 2005/116118 A1 | 12/2005 |
| WO | WO 2006/117801 A2 | 11/2006 |
| WO | WO 2006/117801 A3 | 11/2006 |
| WO | WO 2010/012041 A1 | 2/2010 |
| WO | WO 2010/051589 A1 | 5/2010 |
| WO | WO 2010/131134 A2 | 11/2010 |
| WO | WO 2010/131134 A3 | 11/2010 |
| WO | WO 2011/020170 A1 | 2/2011 |
| WO | WO 2011/080623 A2 | 7/2011 |
| WO | WO 2011/080623 A3 | 7/2011 |

OTHER PUBLICATIONS

Abstract of Japanese Patent—JP9143893, Jun. 3, 1997, 1 page.
Machine Translation of Japanese Patent—JP2005-329658, Dec. 2, 2005, 12 pages.
ASTM D 1238-01—Standard Test Method for Melt Flow Rates of Thermoplastics by Extrusion Plastometer, Current Edition Approved Aug. 10, 2001, 12 pages.
ASTM D 1505-10—Standard Test Method for Density of Plastics by the Density-Gradient Technique, Current Edition Approved Jul. 1, 2010, 7 pages.
ASTM D 3418-08 (3417-99)—Standard Test Method for Temperatures and Enthalpies of Fusion and Crystallization of Polymers by Differential Scanning Calorimetry, Current Edition Approved Nov. 1, 2008, 7 pages.
ASTM D 5034-09—Standard Test Method for Breaking Strength and Elongation of Textile Fabrics (Grab Test), Current Edition Approved Jan. 15, 2009, 8 pages.
ASTM D 5338-11—Standard Test Method for Determining Aerobic Biodegradation of Plastic Materials Under Controlled Composting Conditions. Incorporating Thermophilic Temperatures, Current Edition Approved Apr. 1, 2011, 6 pages.
ASTM D 638-08—Standard Test Method for Tensile Properties for Plastics, Current Edition Approved Apr. 1, 2008, 16 pages.
Related U.S. Patent Applications.
Abstract of Japanese Patent—JPH06114929, Apr. 26, 1994, 2 pages.
Abstract of Japanese Patent—JP2008125799, Jun. 5, 2008, 2 pages.
Abstract of Japanese Patent—JP2011104927, Jun. 2, 2011, 1 page.
Wang et al., U.S. Appl. No. 13/330,771, filed Dec. 20, 2011, Method for Forming a Thermoplastic Composition that Contains a Renewable Biopolymer.
Wang et al., U.S. Appl. No. 13/330,789, filed Dec. 20, 2011, Method for Forming a Thermoplastic Composition that Contains a Plasticized Starch Polymer.
Abstract of Japanese Patent—JP 2010036341, Feb. 18, 2010, 1 page.
Abstract of Japanese Patent—JP 2011-212842, Oct. 27, 2011, 1 page.
Search Report and Written Opinion for PCT/IB2012/057439, May 24, 2013, 13 pages.

\* cited by examiner

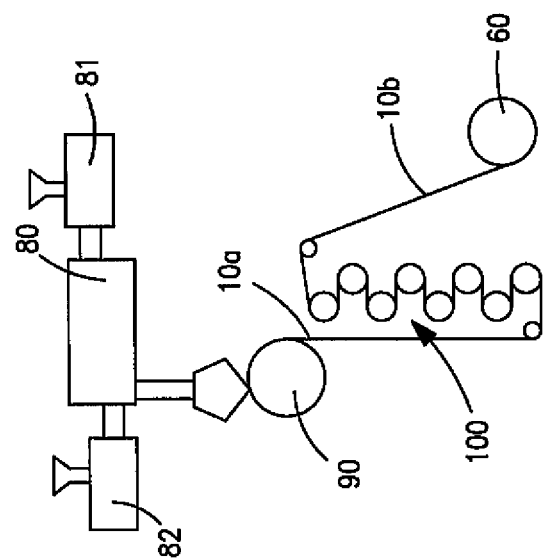

MULTI-LAYERED FILM CONTAINING A BIOPOLYMER

BACKGROUND OF THE INVENTION

Petroleum resources have become more scarce and expensive in recent years, which has further increased the need for environmentally sustainable films containing biopolymers. Unfortunately, it is often difficult to incorporate many commercially available biopolymers (e.g., polylactic acids and some polyhydroxyalkanoates, such as poly-3-hydroxybutyrate and poly-3-hydroxybutyrate-co-3-valerate) into a film. For instance, polylactic acids and polyhydroxyalkanoates have a high stiffness and low ductility, and polyhydroxyalkanoates generally have poor film processability (i.e., slow crystallization, stickiness prior to solidification, etc.) that retards fabrication-line speeds and results in relatively expensive production costs. As such, a need currently exists for a film that contains a biopolymer, but is nevertheless melt processable and capable of achieving good properties (e.g., ductility).

SUMMARY OF THE INVENTION

In accordance with one embodiment of the present invention, a multi-layered film is disclosed that has a thickness of about 250 micrometers or less. The film comprises a core layer that constitutes from about 20% to about 90% of the thickness of the film. The core layer contains from about 10 wt. % to about 95 wt. % of at least one thermoplastic biopolymer and from about 5 wt. % to about 90 wt. % of at least one polyolefin. The film also comprises an outer layer positioned adjacent to the core layer. The outer layer contains about 50 wt. % or more of at least one polyolefin.

In accordance with another embodiment of the present invention, a multi-layered film is disclosed that has a thickness of about 250 micrometers or less. The film comprises a first outer layer that contains about 50 wt. % or more of at least one polyolefin and a second outer layer that contains about 50 wt. % or more of at least one polyolefin. The film also comprises a core layer that is positioned between the first and second outer layers and constitutes from about 20% to about 90% of the thickness of the film. The core layer contains from about 10 wt. % to about 95 wt. % of at least one thermoplastic biopolymer and from about 5 wt. % to about 90 wt. % of at least one polyolefin.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended FIGURE in which:

the FIGURE is a schematic illustration of one embodiment of a method for forming the film of the present invention.

Repeat use of reference characters in the present specification and drawings is intended to represent same or analogous features or elements of the invention.

DETAILED DESCRIPTION OF REPRESENTATIVE EMBODIMENTS

Definitions

As used herein, the term "biodegradable" generally refers to a material that degrades from the action of naturally occurring microorganisms, such as bacteria, fungi, and algae; environmental heat; moisture; or other environmental factors. The degree of degradation may be determined according to ASTM Test Method 5338.92.

As used herein, the term "renewable" generally refers to a material that can be produced or is derivable from a natural source that is periodically (e.g., annually or perennially) replenished through the actions of plants of terrestrial, aquatic or oceanic ecosystems (e.g., agricultural crops, edible and non-edible grasses, forest products, seaweed, or algae), microorganisms (e.g., bacteria, fungi, or yeast), and so forth.

Detailed Description

Reference now will be made in detail to various embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention covers such modifications and variations as come within the scope of the appended claims and their equivalents.

Generally speaking, the present invention is directed to a film that contains a core layer positioned adjacent to an outer layer. The core layer contains a relatively high percentage of thermoplastic biopolymers that are both biodegradable and renewable. Despite being biodegradable and renewable, many biopolymers tend to be relatively stiff in nature. Conventionally, it was thought that such stiff biopolymers could not be readily formed into films having good mechanical properties (e.g., ductility). The present inventors have discovered, however, that through selective control over the components in the core layer and outer layer, a film can be readily formed that has good mechanical properties. Among other things, this is accomplished by blending the biopolymer in the core layer with at least one polyolefin. A polyolefin is also employed in the outer layer. In addition to providing functionality to the film (e.g., heat sealing, printing, etc.), the polyolefin-containing outer layer also helps counteract the stiffness of the biopolymer in the core layer, and helps improve processability. Although polyolefins are normally chemically incompatible with biopolymers due to their different polarities, the present inventors have discovered that phase separation may be minimized by selectively controlling certain aspects of the film, such as the nature and concentration of the polyolefin in the core and outer layers.

In this regard, various embodiments of the present invention will now be described in more detail below.

I. Core Layer

As indicated above, the core layer contains a blend of at least one biodegradable and renewable biopolymer and at least one polyolefin. Typically, the amount of biopolymers employed in the core layer is selectively controlled to achieve a balance of biodegradability, renewability, and ductility. The thermoplastic biopolymers may, for example, constitute from about 10 wt. % to 95 wt. %, in some embodiments from about 50 wt. % to 90 wt. %, and in some embodiments, from about 60 wt. % to about 85 wt. % of the polymer content of the core layer. Likewise, polyolefins typically constitute from about 5 wt. % to about 90 wt. %, in some embodiments from about 10 wt. % to about 50 wt.

%, and in some embodiments, from about 15 wt. % to about 40 wt. % of the polymer content of the core layer.

A. Thermoplastic Biopolymers

The thermoplastic biopolymers of the present invention are both biodegradable and renewable. Particularly suitable biopolymers are agro-derived (e.g., derived from plants, animals, or microorganisms) aliphatic polyesters. One example of such an agro-derived polyester is polylactic acid (PLA) and its copolymers, terpolymers based on polylactic acid. Polylactic acid may, for example, be derived from monomer units of any isomer of lactic acid, such as levorotory-lactic acid ("L-lactic acid"), dextrorotatory-lactic acid ("D-lactic acid"), meso-lactic acid, or mixtures thereof. Monomer units may also be formed from anhydrides of any isomer of lactic acid, including L-lactide, D-lactide, meso-lactide, or mixtures thereof. Cyclic dimers of such lactic acids and/or lactides may also be employed. Any known polymerization method, such as polycondensation or ring-opening polymerization, may be used to polymerize lactic acid. A small amount of a chain-extending agent (e.g., a diisocyanate compound, an epoxy compound or an acid anhydride) may also be employed. The polylactic acid may be a homopolymer or a copolymer, such as one that contains monomer units derived from L-lactic acid, monomer units derived from D-lactic acid, and non-lactic acid comonomers (e.g., glycolic acid, caprolactone, etc.). Although not required, the content of one of the monomer units derived from L-lactic acid and the monomer unit derived from D-lactic acid, and non-lactic acid comonomers may be about 85 mole % or more, in some embodiments about 90 mole % or more, and in some embodiments, about 95 mole % or more. Multiple polylactic acids, each having a different ratio between the monomer unit derived from L-lactic acid and the monomer unit derived from D-lactic acid, may be blended at an arbitrary percentage. The biopolymers may also include blends stereocomplexes of poly-L-lactic acid ("PLLA") and poly-D-lactic acid ("PDLA"). The melting temperature of PLLA can be increased PLLA has a melting temperature of 40-50° C., and its heat deflection temperature can be increased from approximately 60° C. to about up to 190° C. by blending it with PDLA. PDLA and PLLA blends can form a highly regular stereocomplex with increased crystallinity. The temperature stability is optimized when a 50:50 blend is employed, but even a low concentrations of PDLA (e.g., 3-10 wt. %), there is still a substantial improvement in the crystallization rate.

Another suitable agro-derived aliphatic polyester is polyhydroxyalkanoate ("PHA"), which broadly refers to a class of renewable, thermoplastic aliphatic polyesters produced by polymerization of hydroxyaliphatic acids (including dimers of the hydroxyaliphatic acids) as a result of bacterial fermentation of starch, sugars, lipids, etc. PHA polymers may include poly-β-hydroxybutyrate ("PHB") (also known as poly-3-hydroxybutyrate), poly-α-hydroxybutyrate (also known as poly-2-hydroxybutyrate), poly-3-hydroxypropionate, poly-3-hydroxyvalerate ("PHV"), poly-4-hydroxybutyrate, poly-4-hydroxyvalerate, poly-5-hydroxyvalerate, poly-3-hydroxyhexanoate, poly-4-hydroxyhexanoate, poly-6-hydroxyhexanoate, poly-3-hydroxybutyrate-co-3-hydroxyvalerate ("PHBV"), poly-3-hydroxybutyrate-co-4-hydroxybutyrate, poly-3-hydroxybutyrate-co-3-hydroxyhexanoate, poly-3-hydroxybutyrate-co-3-hydroxyoctanoate, poly-3-hydroxybutyrate-co-3-hydroxydecanoate, poly-3-hydroxybutyrate-co-3-hydroxyoctadecanoate, etc. A variety of known techniques may be employed to synthesize such polymers, such as described, for instance, in U.S. Pat. No. 7,267,794 to Kozaki, et al., U.S. Pat. No. 7,276,361 to Doi, et al., U.S. Pat. No. 7,208,535 to Asrar, et al., U.S. Pat. No. 7,176,349 to Dhugga, et al., and U.S. Pat. No. 7,025,908 to Williams, et al.

When employed, such agro-derived polyesters are often relatively stiff in nature. For example, they may have a relatively high glass transition temperature ("$T_g$"), such as about 0° C. or more, in some embodiments, about 4° C. or more, and in some embodiments, from about 5° C. to about 50° C. Nevertheless, the melting point of the agro-derived polyesters is still relatively low, which helps to enhance the rate of biodegradation. For example, the melting point is typically from about 50° C. to about 180° C., in some embodiments from about 80° C. to about 170° C., and in some embodiments, from about 100° C. to about 160° C. The melting temperature and glass transition temperature may be determined using differential scanning calorimetry ("DSC") in accordance with ASTM D-3417 as is well known in the art. Such tests may be employed using a DSC Q100 Differential Scanning calorimeter (outfitted with a liquid nitrogen cooling accessory) and with a THERMAL ADVANTAGE (release 4.6.6) analysis software program, which are available from T:A. Instruments Inc. of New Castle, Del.

The molecular weight of the agro-derived aliphatic polyesters (e.g., polylactic acid, polyhydroxyalkanoate, etc.) may also be controlled within a certain range to help provide the desired properties to the resulting film. For example, the number average molecular weight ("$M_n$") may range from about 40,000 to about 120,000 grams per mole, in some embodiments from about 50,000 to about 100,000 grams per mole, and in some embodiments, from about 60,000 to about 85,000 grams per mole. Likewise, the aliphatic polyester may also have a weight average molecular weight ("$M_w$") ranging from about 70,000 to about 300,000 grams per mole, in some embodiments from about 80,000 to about 200,000 grams per mole, and in some embodiments, from about 100,000 to about 150,000 grams per mole. The ratio of the weight average molecular weight to the number average molecular weight ("$M_w/M_n$"), i.e., the "polydispersity index", is also relatively low. For example, the polydispersity index typically ranges from about 1.0 to about 4.0, in some embodiments from about 1.2 to about 3.0, and in some embodiments, from about 1.4 to about 2.0. The weight and number average molecular weights may be determined by methods known to those skilled in the art.

The aliphatic polyester may also have an apparent viscosity of from about 100 to about 1000 Pascal seconds (Pa·s), in some embodiments from about 200 to about 800 Pa·s, and in some embodiments, from about 300 to about 600 Pa·s, as determined at a temperature of 170° C. and a shear rate of 1000 sec$^{-1}$. The melt flow index of the polyester may also range from about 0.1 to about 30 grams per 10 minutes, in some embodiments from about 0.5 to about 10 grams per 10 minutes, and in some embodiments, from about 1 to about 5 grams per 10 minutes. The melt flow index is the weight of a polymer (in grams) that may be forced through an extrusion rheometer orifice (0.0825-inch diameter) when subjected to a load of 2160 grams in 10 minutes at a certain temperature (e.g., 190° C.), measured in accordance with ASTM Test Method D1238-E. Of course, the melt flow index of the polyester will ultimately depend upon the selected film-forming process. For example, when extruded as a cast film, higher melt flow index polymers are typically desired, such as about 4 grams per 10 minutes or more, in some embodiments, from about 5 to about 12 grams per 10 minutes, and in some embodiments, from about 7 to about 9 grams per 10 minutes. Likewise, when formed as a blown film, lower melt flow index polymers are typically desired, such as less than about 12 grams per 10 minutes or less, in some embodiments from about 1 to about 7 grams per 10 minutes, and in some embodiments, from about 2 to about 5 grams per 10 minutes.

While the agro-derived aliphatic polyesters are discussed in detail above, it should be understood that other types of biopolymers that are biodegradable and renewable may also be employed in the core layer. For example, petroleum-derived aliphatic polyesters may be employed in certain embodiments, such as polycaprolactone, polyesteramides, polyglycolic acid, polyalkylene succinates (e.g., polybutylene succinate, polybutylene succinate adipate, polyethylene succinate, etc.), and so forth. Of course, polyalkylene succinates may also be agro-derived or bio-based, such as by polymerizing the succinic acid derived from fermentation of natural substrates (e.g., carbohydrates) with diols derived from agro-based feedstock (e.g., bio-based 1,3-propanediol or 1,4-butane diol from fermentation or hydrogenation of agro-derived diacids). Still other suitable biopolymers may include cellulose and derivatives thereof (e.g., hemicellulose, cellulose esters, etc.), chitosan, alginates, plant proteins, (e.g., corn protein, soy protein, etc.), polypeptides, glycoproteins, etc.

B. Polyolefins

As indicated above, a polyolefin is also employed in the core layer. Among other things, the polyolefin helps to counteract the stiffness of the biopolymer, thereby improving ductility and melt processability of the film. Although nonpolar in nature, the present inventors have discovered that the effects of any phase separation that would be normally expected due to the presence of a polar biopolymer can be minimized by employing an outer layer that is also nonpolar in nature. Exemplary polyolefins for this purpose may include, for instance, polyethylene, polypropylene, blends and copolymers thereof. In one particular embodiment, a polyethylene is employed that is a copolymer of ethylene and an α-olefin, such as a $C_3$-$C_{20}$ α-olefin or $C_3$-$C_{12}$ α-olefin. Suitable α-olefins may be linear or branched (e.g., one or more $C_1$-$C_3$ alkyl branches, or an aryl group). Specific examples include 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin co-monomers are 1-butene, 1-hexene and 1-octene. The ethylene content of such copolymers may be from about 60 mole % to about 99 mole %, in some embodiments from about 80 mole % to about 98.5 mole %, and in some embodiments, from about 87 mole % to about 97.5 mole %. The α-olefin content may likewise range from about 1 mole % to about 40 mole %, in some embodiments from about 1.5 mole % to about 15 mole %, and in some embodiments, from about 2.5 mole % to about 13 mole %.

The density of the polyethylene may vary depending on the type of polymer employed, but generally ranges from 0.85 to 0.96 grams per cubic centimeter ("$g/cm^3$"). Polyethylene "plastomers", for instance, may have a density in the range of from 0.85 to 0.91 $g/cm^3$. Likewise, "linear low density polyethylene" ("LLDPE") may have a density in the range of from 0.91 to 0.940 $g/cm^3$; "low density polyethylene" ("LDPE") may have a density in the range of from 0.910 to 0.940 $g/cm^3$; and "high density polyethylene" ("HDPE") may have density in the range of from 0.940 to 0.970 $g/cm^3$. Densities may be measured in accordance with ASTM 1505. Particularly suitable ethylene-based polymers for use in the present invention may be available under the designation EXACT™ from ExxonMobil Chemical Company of Houston, Tex. Other suitable polyethylene plastomers are available under the designation ENGAGE™ and AFFINITY™ from Dow Chemical Company of Midland, Mich. Still other suitable ethylene polymers are available from The Dow Chemical Company under the designations DOWLEX™ (LLDPE) and ATTANE™ (ULDPE). Other suitable ethylene polymers are described in U.S. Pat. No. 4,937,299 to Ewen et al.; U.S. Pat. No. 5,218,071 to Tsutsui et al.; U.S. Pat. No. 5,272,236 to Lai, et al.; and U.S. Pat. No. 5,278,272 to Lai, et al., which are incorporated herein in their entirety by reference thereto for all purposes.

Of course, the present invention is by no means limited to the use of ethylene polymers. For instance, propylene polymers may also be suitable for use as a semi-crystalline polyolefin. Suitable propylene polymers may include, for instance, polypropylene homopolymers, as well as copolymers or terpolymers of propylene with an α-olefin (e.g., $C_3$-$C_{20}$), such as ethylene, 1-butene, 2-butene, the various pentene isomers, 1-hexene, 1-octene, 1-nonene, 1-decene, 1-undecene, 1-dodecene, 4-methyl-1-pentene, 4-methyl-1-hexene, 5-methyl-1-hexene, vinylcyclohexene, styrene, etc. The comonomer content of the propylene polymer may be about 35 wt. % or less, in some embodiments from about 1 wt. % to about 20 wt. %, and in some embodiments, from about 2 wt. % to about 10 wt. %. The density of the polypropylene (e.g., propylene/α-olefin copolymer) may be 0.95 grams per cubic centimeter ($g/cm^3$) or less, in some embodiments, from 0.85 to 0.92 $g/cm^3$, and in some embodiments, from 0.85 $g/cm^3$ to 0.91 $g/cm^3$. Suitable propylene polymers are commercially available under the designations VISTAMAXX™ from ExxonMobil Chemical Co. of Houston, Tex.; FINA™ (e.g., 8573) from Atofina Chemicals of Feluy, Belgium; TAFMER™ available from Mitsui Petrochemical Industries; and VERSIFY™ available from Dow Chemical Co. of Midland, Mich. Other examples of suitable propylene polymers are described in U.S. Pat. No. 6,500,563 to Datta, et al.; U.S. Pat. No. 5,539,056 to Yang, et al.; and U.S. Pat. No. 5,596,052 to Resconi, et al., which are incorporated herein in their entirety by reference thereto for all purposes.

Any of a variety of known techniques may generally be employed to form the polyolefins. For instance, olefin polymers may be formed using a free radical or a coordination catalyst (e.g., Ziegler-Natta or metallocene). Metallocene-catalyzed polyolefins are described, for instance, in U.S. Pat. No. 5,571,619 to McAlpin et al.; U.S. Pat. No. 5,322,728 to Davis et al.; U.S. Pat. No. 5,472,775 to Obijeski et al.; U.S. Pat. No. 5,272,236 to Lai et al.; and U.S. Pat. No. 6,090,325 to Wheat, et al., which are incorporated herein in their entirety by reference thereto for all purposes.

The melt flow index (MI) of the polyolefins may generally vary, but is typically in the range of about 0.1 grams per 10 minutes to about 100 grams per 10 minutes, in some embodiments from about 0.5 grams per 10 minutes to about 30 grams per 10 minutes, and in some embodiments, about 1 to about 10 grams per 10 minutes, determined at 190° C. The melt flow index is the weight of the polymer (in grams) that may be forced through an extrusion rheometer orifice (0.0825-inch diameter) when subjected to a force of 2160 grams in 10 minutes at 190° C., and may be determined in accordance with ASTM Test Method D1238-E.

C. Other Components

One beneficial aspect of the present invention is that a film can be readily formed without the need for compatibilizers or plasticizers conventionally thought to be required to melt process a biopolymer. Thus, in certain embodiments, the core layer may be free of such ingredients, which further enhances the overall biodegradability and renewability of the film. Nevertheless, in some cases, compatibilizer and/or plasticizers may still be employed in the core layer, typically in an amount of no more than about 40 wt. %, in some embodiments from about 0.1 wt. % to about 30 wt. %, in some embodiments from about 0.5 wt. % to about 25 wt. %, and in some embodiments, from about 1 wt. % to about 15 wt. % of the core layer.

When employed, the compatibilizer may be a functionalized polyolefin that possesses a polar component provided by one or more functional groups that is compatible with the biopolymer and a non-polar component provided by an olefin that is compatible with the polyolefin. The polar component may, for example, be provided by one or more functional groups and the non-polar component may be provided by an olefin. The olefin component of the compatibilizer may generally be formed from any linear or branched α-olefin monomer, oligomer, or polymer (including copolymers) derived from an olefin monomer. The α-olefin monomer typically has from 2 to 14 carbon atoms and preferably from 2 to 6 carbon atoms. Examples of suitable monomers include, but not limited to, ethylene, propylene, butane, pentene, hexene, 2-methyl-1-propene, 3-methyl-1-pentene, 4-methyl-1-pentene, and 5-methyl-1-hexene. Examples of polyolefins include both homopolymers and copolymers, i.e., polyethylene, ethylene copolymers such as EPDM, polypropylene, propylene copolymers, and polymethylpentene polymers. An olefin copolymer can include a minor amount of non-olefinic monomers, such as styrene, vinyl acetate, diene, or acrylic and non-acrylic monomer. Functional groups may be incorporated into the polymer backbone using a variety of known techniques. For example, a monomer containing the functional group may be grafted onto a polyolefin backbone to form a graft copolymer. Such grafting techniques are well known in the art and described, for instance, in U.S. Pat. No. 5,179,164. In other embodiments, the monomer containing the functional groups may be copolymerized with an olefin monomer to form a block or random copolymer. Regardless of the manner in which it is incorporated, the functional group of the compatibilizer may be any group that provides a polar segment to the molecule, such as a carboxyl group, acid anhydride group, acid amide group, imide group, carboxylate group, epoxy group, amino group, isocyanate group, group having oxazoline ring, hydroxyl group, and so forth. Maleic anhydride modified polyolefins are particularly suitable for use in the present invention. Such modified polyolefins are typically formed by grafting maleic anhydride onto a polymeric backbone material. Such maleated polyolefins are available from E. I. du Pont de Nemours and Company under the designation Fusabond®, such as the P Series (chemically modified polypropylene), E Series (chemically modified polyethylene), C Series (chemically modified ethylene vinyl acetate), A Series (chemically modified ethylene acrylate copolymers or terpolymers), or N Series (chemically modified ethylene-propylene, ethylene-propylene diene monomer ("EPDM") or ethylene-octene). Alternatively, maleated polyolefins are also available from Chemtura Corp. under the designation Polybond® and Eastman Chemical Company under the designation Eastman G series, and AMPLIFY™ GR Functional Polymers (maleic anhydride grafted polyolefins).

Likewise, when employed, suitable plasticizers may include polyhydric alcohol plasticizers, such as sugars (e.g., glucose, sucrose, fructose, raffinose, maltodextrose, galactose, xylose, maltose, lactose, mannose, and erythrose), sugar alcohols (e.g., erythritol, xylitol, malitol, mannitol, and sorbitol), polyols (e.g., ethylene glycol, glycerol, propylene glycol, dipropylene glycol, butylene glycol, and hexane triol), etc. Also suitable are hydrogen bond-forming organic compounds which do not have hydroxyl group, including urea and urea derivatives; anhydrides of sugar alcohols such as sorbitan; animal proteins such as gelatin; vegetable proteins such as sunflower protein, soybean proteins, cotton seed proteins; and mixtures thereof. Other suitable plasticizers may include phthalate esters, dimethyl and diethylsuccinate and related esters, glycerol triacetate, glycerol mono and diacetates, glycerol mono, di, and tripropionates, butanoates, stearates, lactic acid esters, citric acid esters, adipic acid esters, stearic acid esters, oleic acid esters, and other acid esters. Aliphatic acids may also be used, such as copolymers of ethylene and acrylic acid, polyethylene grafted with maleic acid, polybutadiene-co-acrylic acid, polybutadiene-co-maleic acid, polypropylene-co-acrylic acid, polypropylene-co-maleic acid, and other hydrocarbon based acids. A low molecular weight plasticizer is preferred, such as less than about 20,000 g/mol, preferably less than about 5,000 g/mol and more preferably less than about 1,000 g/mol.

Besides the components noted above, still other additives may also be incorporated into the core layer, such as melt stabilizers, dispersion aids (e.g., surfactants), processing aids (PPA) or stabilizers, heat stabilizers, light stabilizers, antioxidants, heat aging stabilizers, whitening agents, anti-blocking agents, bonding agents, lubricants, fillers, anti-static additives, etc.

II. Outer Layer

As indicated above, the outer layer of the multi-layered film contains at least one polyolefin. In addition to providing functionality to the film (e.g., heat sealing, printing, etc.), the outer layer also helps counteract the stiffness of the biopolymer in the core layer, and helps improve processability. Exemplary polyolefins for this purpose may include, for instance, polyethylene, polypropylene, blends and copolymers thereof, such as described above. Ethylene copolymers are particularly suitable for use in the outer layer, such as LDPE, LLDPE, polyethylene elastomers, single-site catalyzed polyolefins (e.g., metallocene-catalyzed), ethylene vinyl acetate copolymers, ethylene acrylic acid copolymers, ethylene methacrylic acid copolymers, ethylene methyl acrylate copolymers, ethylene butyl acrylate copolymers, ethylene vinyl alcohol copolymers, etc.

To help ensure that the desired properties are achieved, polyolefins constitute at least the majority of the outer layer, such as about 50 wt. % or more, in some embodiments about 60 wt. % or more, and in some embodiments, about 75 wt. % or more. In certain embodiments, for example, polyolefins may constitute the entire polymer content of the outer layer. In other embodiments, however, it may be desired to incorporate one or more additional polymers in the outer layer that are biodegradable, renewable, or both, typically in an amount of no more than about 50 wt. %, in some embodiments from about 1 wt. % to about 45 wt. %, and in some embodiments, from about 5 wt. % to about 40 wt. % of the polymer content of the outer layer.

When employed in the outer layer, the additional polymers may include any of the biopolymers referenced above.

In addition to those noted above, another suitable polymer that may be employed in the outer layer is a starch layer, which can be both biodegradable and renewable. Although starch polymers are produced in many plants, typical sources includes seeds of cereal grains, such as corn, waxy corn, wheat, sorghum, rice, and waxy rice; tubers, such as potatoes; roots, such as tapioca (i.e., cassava and manioc), sweet potato, and arrowroot; and the pith of the sago palm. Broadly speaking, any native (unmodified) and/or modified starch (e.g., chemically or enzymatically modified) may be employed in the present invention. Chemically modified starches may, for instance, be obtained through typical processes known in the art (e.g., esterification, etherification, oxidation, acid hydrolysis, enzymatic hydrolysis, etc.). Starch ethers and/or esters may be particularly desirable, such as hydroxyalkyl starches, carboxymethyl starches, etc. The hydroxyalkyl group of hydroxylalkyl starches may contain, for instance, 2 to 10 carbon atoms, in some embodiments from 2 to 6 carbon atoms, and in some embodiments, from 2 to 4 carbon atoms. Representative hydroxyalkyl starches such as hydroxyethyl starch, hydroxypropyl starch, hydroxybutyl starch, and derivatives thereof. Starch esters, for instance, may be prepared using a wide variety of anhydrides (e.g., acetic, propionic, butyric, and so forth), organic acids, acid chlorides, or other esterification reagents. The degree of esterification may vary as desired, such as from 1 to 3 ester groups per glucosidic unit of the starch.

The starch polymer may contain different weight percentages of amylose and amylopectin, different polymer molecular weights, etc. High amylose starches contain greater than about 50% by weight amylose and low amylose starches contain less than about 50% by weight amylose. Although not required, low amylose starches having an amylose content of from about 10% to about 40% by weight, and in some embodiments, from about 15% to about 35% by weight, are particularly suitable for use in the present invention. Examples of such low amylose starches include corn starch and potato starch, both of which have an amylose content of approximately 20% by weight. Particularly suitable low amylose starches are those having a number average molecular weight ("$M_n$") ranging from about 50,000 to about 1,000,000 grams per mole, in some embodiments from about 75,000 to about 800,000 grams per mole, and in some embodiments, from about 100,000 to about 600,000 grams per mole, and/or a weight average molecular weight ("$M_w$") ranging from about 5,000,000 to about 25,000,000 grams per mole, in some embodiments from about 5,500,000 to about 15,000,000 grams per mole, and in some embodiments, from about 6,000,000 to about 12,000,000 grams per mole. The ratio of the weight average molecular weight to the number average molecular weight ("$M_w/M_n$"), i.e., the "polydispersity index", is also relatively high. For example, the polydispersity index may range from about 10 to about 100, and in some embodiments, from about 20 to about 80. The weight and number average molecular weights may be determined by methods known to those skilled in the art.

If desired, a plasticizer may also be employed in the outer layer to further enhance the ability of an additional polymer (e.g., starch polymer, cellulose polymer, etc.) contained therein to be melt processed. For example, such plasticizers can soften and penetrate into the outer membrane of a starch polymer and cause the inner starch chains to absorb water and swell. This swelling will, at some point, cause the outer shell to rupture and result in an irreversible destructurization of starch granules. Once destructurized, the starch polymer chains, which are initially compressed within the granules, may stretch out and form a generally disordered intermingling of polymer chains. Upon resolidification, however, the chains may reorient themselves to form crystalline or amorphous solids having varying strengths depending on the orientation of the starch polymer chains.

A plasticizer may be incorporated into the outer layer using any of a variety of known techniques. For example, polymers may be "pre-plasticized" prior to incorporation into the film to form what is often referred to as a "thermoplastic masterbatch." The relative amount of the polymer and plasticizer employed in the thermoplastic masterbatch may vary depending on a variety of factors, such as the desired molecular weight, the type of polymer, the affinity of the plasticizer for the polymer, etc. Typically, however, polymers constitute from about 40 wt. % to about 98 wt. %, in some embodiments from about 50 wt. % to about 95 wt. %, and in some embodiments, from about 60 wt. % to about 90 wt. % of the thermoplastic masterbatch. Likewise, plasticizers typically constitute from about 2 wt. % to about 60 wt. %, in some embodiments from about 5 wt. % to about 50 wt. %, and in some embodiments, from about 10 wt. % to about 40 wt. % of the thermoplastic masterbatch. Batch and/or continuous melt blending techniques may be employed to blend a polymer and plasticizer and form a masterbatch. For example, a mixer/kneader, Banbury mixer, Farrel continuous mixer, single-screw extruder, twin-screw extruder, roll mill, etc., may be utilized. One particularly suitable melt-blending device is a co-rotating, twin-screw extruder (e.g., USALAB twin-screw extruder available from Thermo Electron Corporation of Stone, England or an extruder available from Coperion Werner Pfleiderer from Ramsey, N.J.). Such extruders may include feeding and venting ports and provide high intensity distributive and dispersive mixing. For example, a polymer may be initially fed to a feeding port of the twin-screw extruder. Thereafter, a plasticizer may be injected into the polymer composition. Alternatively, the polymer may be simultaneously fed to the feed throat of the extruder or separately at a different point along its length. Melt blending may occur at any of a variety of temperatures, such as from about 30° C. to about 200° C., in some embodiments, from about 40° C. to about 160° C., and in some embodiments, from about 50° C. to about 150° C.

In addition to those mentioned above, other additives may also be employed in the outer layer as is known in the art, such as melt stabilizers, dispersion aids (e.g., surfactants), processing aids or stabilizers, heat stabilizers, light stabilizers, antioxidants, heat aging stabilizers, whitening agents, antiblocking agents, bonding agents, lubricants, fillers, antistatic additives, etc.

II. Film Construction

The film of the present invention contains a core layer that is positioned adjacent to an outer layer. In addition to these layers, it should be understood that various other layers may also be employed in the film. For example, the film may contain from two (2) to fifteen (15) layers, and in some embodiments, from three (3) to twelve (12) layers. In one embodiment, for example, the film is a two-layered film that contains only the core layer and the outer layer. In another embodiment, the film contains more than two layers (e.g., three (3) layers) in which the core layer is positioned between first and second outer layers. In such embodiments, the first outer layer may serve as a heat-sealing layer of the film, and the second outer layer may serve as a printable layer. The first outer layer, second outer layer, or both may be formed in the manner described above. For example, polyolefins may constitute at least the majority of the first outer layer and/or second outer layer, such as about 50 wt. % or more, in some embodiments about 60 wt. % or more, and in some embodiments, about 75 wt. % or more. In certain embodiments, for example, polyolefins may constitute the entire polymer content of the first outer layer and/or the second outer layer. In other embodiments, as noted above, one or more additional polymers may be employed in the first outer layer and/or second outer layer that are biodegradable, renewable, or both, typically in an amount of no more than about 50 wt. %, in some embodiments from about 1 wt. % to about 45 wt. %, and in some embodiments, from about 5 wt. % to about 40 wt. % of the polymer content of the respective outer layer. It should be noted the first and second outer layers may be formed from the same composition (e.g., same type of polyolefins and same concentration of polyolefins, etc.) or from a different composition (e.g., different types of polyolefins and/or different concentration of polyolefins).

Regardless of the number of layers employed, the core layer typically constitutes a substantial portion of the thickness of the film, such as from about 20% to about 90%, in some embodiments from about 30% to about 80%, and in some embodiments, from about 40% to about 70% of the thickness of the film. On the other hand, the combined thickness of the outer layer(s) is typically from about 10% to about 65%, in some embodiments from about 20% to about 60%, and in some embodiments, from about 25% to about 55% of the thickness of the film. When two outer layers are employed, for example, each individual outer layer may constitute from about 5% to about 35%, in some embodiments from about 10% to about 30%, and in some embodiments, from about 12% to about 28% of the thickness of the film. The total thickness of the film may generally vary depending upon the desired use. Nevertheless, the film thickness is typically minimized to increase flexibility and reduce the time needed for the film to degrade. Thus, in most embodiments of the present invention, the film has a total thickness of about 250 micrometers or less, in some embodiments from about 1 to about 200 micrometers, in some embodiments from about 2 to about 150 micrometers, and in some embodiments, from about 5 to about 120 micrometers. For example, when two outer layers are employed, each individual layer may have a thickness of from about 0.5 to about 50 micrometers, in some embodiments from about 1 to about 35 micrometers, and in some embodiments, from about 5 to about 25 micrometers. Likewise, the core layer may have a thickness of from about from about 10 to about 100 micrometers, in some embodiments from about 15 to about 80 micrometers, and in some embodiments, from about 20 to about 60 micrometers.

Despite having such a small thickness, the film of the present invention is nevertheless able to retain good mechanical properties during use. One parameter that is indicative of the relative dry strength of the film is the ultimate tensile strength, which is equal to the peak stress obtained in a stress-strain curve, such as obtained in accordance with ASTM Standard D-5034. Desirably, the film of the present invention exhibits a peak stress (when dry) in the machine direction ("MD") of from about 10 to about 100 Megapascals (MPa), in some embodiments from about 15 to about 70 MPa, and in some embodiments, from about 20 to about 60 MPa, and a peak stress in the cross-machine direction ("CD") of from about 2 to about 40 Megapascals (MPa), in some embodiments from about 4 to about 40 MPa, and in some embodiments, from about 5 to about 30 MPa.

Although possessing good strength, the film is relatively ductile. One parameter that is indicative of the ductility of the film is the percent strain of the film at its break point, as determined by the stress-strain curve, such as obtained in accordance with ASTM Standard D-5034. For example, the percent strain at break of the film in the machine direction may be about 200% or more, in some embodiments about 250% or more, and in some embodiments, from about 300% to about 800%. Likewise, the percent strain at break of the film in the cross-machine direction may be about 300% or more, in some embodiments about 400% or more, and in some embodiments, from about 500% to about 1000%. Another parameter that is indicative of stiffness is the modulus of elasticity of the film, which is equal to the ratio of the tensile stress to the tensile strain and is determined from the slope of a stress-strain curve. For example, the film typically exhibits a modulus of elasticity (when dry) in the machine direction ("MD") of from about 50 to about 600 Megapascals ("MPa"), in some embodiments from about 60 to about 500 MPa, and in some embodiments, from about 100 to about 400 MPa, and a modulus in the cross-machine direction ("CD") of from about 50 to about 600 Megapascals ("MPa"), in some embodiments from about 60 to about 500 MPa, and in some embodiments, from about 100 to about 400 MPa.

The multi-layered film of the present invention may be prepared by co-extrusion of the layers, extrusion coating, or by any conventional layering process. Two particularly advantageous processes are cast film coextrusion and blown film coextrusion. In such processes, two or more of the film layers are formed simultaneously and exit the extruder in a multilayer form. Some examples of such processes are described in U.S. Pat. No. 6,075,179 to McCormack, et al. and U.S. Pat. No. 6,309,736 to McCormack, et al., which are incorporated herein in their entirety by reference thereto for all purposes. Referring to the FIGURE, for instance, one embodiment of a method for forming a co-extruded cast film is shown. In the particular embodiment of the FIGURE, the raw materials for the outer layer (not shown) are supplied to a first extruder 81 and the raw material for the core layer (not shown) are supplied to a second extruder 82. The extruders feed the compounded materials to a die 80 that casts the layers onto a casting roll 90 to form a two-layered precursor film 10*a*. Additional extruders (not shown) may optionally be employed to form other layers of the film as is known in the art. The casting roll 90 may optionally be provided with embossing elements to impart a pattern to the film. Typically, the casting roll 90 is kept at temperature sufficient to solidify and quench the sheet 10*a* as it is formed, such as from about 20 to 60° C. If desired, a vacuum box may be positioned adjacent to the casting roll 90 to help keep the precursor film 10*a* close to the surface of the roll 90. Additionally, air knives or electrostatic pinners may help force the precursor film 10*a* against the surface of the casting roll 90 as it moves around a spinning roll. An air knife is a device known in the art that focuses a stream of air at a very high flow rate to pin the edges of the film.

In addition to casting, other methods may also be used to form the film, such as blowing, flat die extruding, etc. For example, the film may be formed by a blown process in which a gas (e.g., air) is used to expand a bubble of the extruded polymer blend through an annular die. The bubble is then collapsed and collected in flat film form. Processes for producing blown films are described, for instance, in U.S. Pat. No. 3,354,506 to Raley; U.S. Pat. No. 3,650,649 to Schippers; and U.S. Pat. No. 3,801,429 to Schrenk et al., as well as U.S. Patent Application Publication Nos. 2005/0245162 to McCormack, et al. and 2003/0068951 to Boggs, et al.

Regardless of how it is formed, the film may then be optionally oriented in one or more directions to further improve film uniformity and reduce thickness. For example, the film may be immediately reheated to a temperature below the melting point of one or more polymers in the film, but high enough to enable the composition to be drawn or stretched. In the case of sequential orientation, the "softened" film is drawn by rolls rotating at different speeds or rates of rotation such that the sheet is stretched to the desired draw ratio in the longitudinal direction (machine direction). This "uniaxially" oriented film may then be laminated to a fibrous web. In addition, the uniaxially oriented film may also be oriented in the cross-machine direction to form a "biaxially oriented" film. For example, the film may be clamped at its lateral edges by chain clips and conveyed into a tenter oven. In the tenter oven, the film may be reheated and drawn in the cross-machine direction to the desired draw ratio by chain clips, which are diverged in their forward travel.

Referring again to the FIGURE, for instance, one method of forming a uniaxially oriented film is shown. As illustrated, the precursor film 10a is directed to a film-orientation unit 100 or machine direction orienter ("MDO"), such as commercially available from Marshall and Willams, Co. of Providence, R.I. The MDO has a plurality of stretching rolls (such as from 5 to 8) which progressively stretch and thin the film in the machine direction, which is the direction of travel of the film through the process as shown in the FIGURE. While the MDO 100 is illustrated with eight rolls, it should be understood that the number of rolls may be higher or lower, depending on the level of stretch that is desired and the degrees of stretching between each roll. The film may be stretched in either single or multiple discrete stretching operations. It should be noted that some of the rolls in an MDO apparatus may not be operating at progressively higher speeds. If desired, some of the rolls of the MDO 100 may act as preheat rolls. If present, these first few rolls heat the film 10a above room temperature (e.g., to 125° F.). The progressively faster speeds of adjacent rolls in the MDO act to stretch the film 10a. The rate at which the stretch rolls rotate determines the amount of stretch in the film and final film weight. The resulting film 10b may then be wound and stored on a take-up roll 60. While not shown here, various additional potential processing and/or finishing steps known in the art, such as slitting, treating, aperturing, printing graphics, or lamination of the film with other layers (e.g., nonwoven web materials), may be performed without departing from the spirit and scope of the invention.

III. Applications

The film of the present invention is particularly suitable for use as a packaging film, such as an individual wrap, packaging pouches, or bags for the use of a variety of articles, such as food products, paper products (e.g., tissue, wipes, paper towels, etc.), absorbent articles, etc. Various suitable pouch, wrap, or bag configurations for absorbent articles are disclosed, for instance, in U.S. Pat. No. 6,716,203 to Sorebo, et al. and U.S. Pat. No. 6,380,445 to Moder, et al., as well as U.S. Patent Application Publication No. 2003/0116462 to Sorebo, et al., all of which are incorporated herein in their entirety by reference thereto for all purposes.

The film may also be employed in other applications. For example, the film may be used in an absorbent article. An "absorbent article" generally refers to any article capable of absorbing water or other fluids. Examples of some absorbent articles include, but are not limited to, personal care absorbent articles, such as diapers, training pants, absorbent underpants, incontinence articles, feminine hygiene products (e.g., sanitary napkins, pantiliners, etc.), swim wear, baby wipes, and so forth; medical absorbent articles, such as garments, fenestration materials, underpads, bed pads, bandages, absorbent drapes, and medical wipes; food service wipers; clothing articles; and so forth. Several examples of such absorbent articles are described in U.S. Pat. No. 5,649,916 to DiPalma, et al.; U.S. Pat. No. 6,110,158 to Kielpikowski; U.S. Pat. No. 6,663,611 to Blaney, at al., which are incorporated herein in their entirety by reference thereto for all purposes. Still other suitable articles are described in U.S. Patent Application Publication No. 2004/0060112 A1 to Fell at al., as well as U.S. Pat. No. 4,886,512 to Damico et al.; U.S. Pat. No. 5,558,659 to Sherrod et al.; U.S. Pat. No. 6,888,044 to Fell et al.; and U.S. Pat. No. 6,511,465 to Freiburger et al., all of which are incorporated herein in their entirety by reference thereto for all purposes. Materials and processes suitable for forming such absorbent articles are well known to those skilled in the art.

The present invention may be better understood with reference to the following examples.

Test Methods

Tensile Properties:

Prior to testing, samples were initially conditioned at 75° F./50% relative humidity for 24 hours. Thereafter, the strip tensile strength values were determined in accordance with ASTM Standard D-5034. A constant-rate-of-extension type of tensile tester was employed. The tensile testing system was a Synergie 200 tensile frame. The tensile tester was equipped with TESTWORKS 4.08B software from MTS Systems Corp. to support the testing. An appropriate load cell was selected so that the tested value fell within the range of 10-90% of the full scale load. The film samples were initially cut into dog-bone shapes with a center width of 3.0 mm before testing. The samples were held between grips having a front and back face measuring 25.4 millimeters×76 millimeters. The grip faces were rubberized, and the longer dimension of the grip was perpendicular to the direction of pull. The grip pressure was pneumatically maintained at a pressure of 40 pounds per square inch. The tensile test was run using a gauge length of 18.0 millimeters and a break sensitivity of 40%. Five samples were tested by applying the test load along the machine-direction and five samples were tested by applying the test load along the cross direction. During the test, samples were stretched at a crosshead speed of about 127 millimeters per minute until breakage occurred. The modulus of elasticity, peak load, peak stress, elongation (percent strain at break), and energy per volume at break (total area under the stress-strain curve) were measured.

Comparative Examples 1-2

Two (2) different single-layered films were initially formed from the following polymers:

Control 1: 100 wt. % polylactic acid (PLA 4042 from Natureworks); and

Control 2: 100 wt. % poly(3-hydroxybutyrate-co-3-hydroxyvalerate ("PHBy").

The polymer materials were extruded with a Haake single screw extruder (L/D ratio of 25) and cast through a 6-inch die and collected on a chill roll assembly. The casting conditions are set forth below in Table 1.

TABLE 1

Film Casting Processing Conditions

| Ex. | Speed (rpm) | Zone 1 (° C.) | Zone 2 (° C.) | Zone 3 (° C.) | Die Temp. (° C.) | Melt Temp (° C.) | Die Pressure (barr) | Torque (N * m) |
|---|---|---|---|---|---|---|---|---|
| Control 1 | 40 | 180 | 183 | 185 | 185 | 203 | 13 | 16 |
| Control 2 | 40 | 145 | 150 | 155 | 160 | 178 | 12 | 9 |

The MD and CD tensile properties of the films were determined as described above. The results are set forth below in Tables 2-3.

TABLE 2

MD Tensile Properties

| Ex. | Thickness (microns) | Peak Load (gf) | Peak Stress (MPa) | Strain @ Break (%) | Modulus (MPa) | Break Stress (MPa) | Energy per Volume @ Break (J/cm$^3$) |
|---|---|---|---|---|---|---|---|
| Control 1 | 25.4 | 465 | 60 | 6 | 2401 | 51 | 2.6 |
| Control 2 | 35.6 | 309 | 28 | 292 | 1236 | 21 | 57 |

TABLE 3

CD Tensile Properties

| Ex. | Thickness (mil) | Peak Load (gf) | Peak Stress (MPa) | Strain @ Break (%) | Modulus (MPa) | Break Stress (MPa) | Energy per Volume @ Break (J/cm$^3$) |
|---|---|---|---|---|---|---|---|
| Control 1 | 25.4 | 358 | 46 | 4 | 2245 | 41 | 1.3 |
| Control 2 | 33.0 | 145 | 14 | 15 | 414 | 11 | 1.6 |

Examples 1-7

Seven (7) different single-layered films were initially formed from the following polymer blends:

Example 1: 80 wt. % Dowlex™ 2244G LLDPE (Dow Chemical Co.) and 20 wt. % poly-3-hydroxybutyrate-4-hydroxybutyrate ("PHA");

Example 2: 80 wt. % Dowlex™ 2244G LLDPE and 20 wt. polybutylene succinate ("PBS") (Mitsubishi Chemical Co.);

Example 3: 80 wt. % Dowlex™ 2244G LLDPE and 20 wt. % poly(3-hydroxybutyrate-co-3-hydroxyvalerate ("PHBV");

Example 4: 100 wt. % Dowlex™ 2244G LLDPE;

Example 5: 30 wt. % Dowlex™ 2244G LLDPE and 70 wt. % polylactic acid (PLA 4042 from Natureworks);

Example 6: 80 wt. % Dowlex™ 2244G LLDPE and 20 wt. % polylactic acid (PLA 4042 from Natureworks); and Example 7: 50 wt. % Dowlex™ 2244G LLDPE and 50 wt. % Biohybrid™ BL-F (a thermoplastic starch masterbatch available from Cardia Bioplastics).

The polymer materials were extruded with a Haake single screw extruder (L/D ratio of 25) and cast through a 6-inch die and collected on a chill roll assembly. The casting conditions are set forth below in Table 4.

TABLE 4

Film Casting Processing Conditions

| Ex. | Speed (rpm) | Zone 1 (° C.) | Zone 2 (° C.) | Zone 3 (° C.) | Die Temp. (° C.) | Melt Temp (° C.) | Die Pressure (barr) | Torque (N * m) |
|---|---|---|---|---|---|---|---|---|
| 1 | 50 | 170 | 175 | 178 | 180 | 194 | 10 | 8 |
| 2 | 50 | 155 | 160 | 160 | 165 | 173 | 12 | 9 |
| 3 | 80 | 160 | 165 | 165 | 170 | 186 | 14 | 12 |
| 4 | 50 | 160 | 160 | 165 | 170 | 181 | 16 | 13 |
| 5 | 50 | 160 | 165 | 165 | 170 | 184 | 14 | 10 |
| 6 | 40 | 160 | 165 | 165 | 170 | 177 | 17 | 13 |
| 7 | 50 | 160 | 165 | 165 | 170 | 185 | 16 | 12 |

The thickness of the films of Examples 1-7 (unpressed) was 35.6 μm, 28.0 μm, 28.0 μm, 22.9 μm, 38.1 μm, 25.4 μm, and 28.0 μm, respectively.

Examples 8-17

Three-layer films were prepared by pressing together the single-layered films of Examples 1-7 using a 15-ton hydraulic Carver press. The press had two platens set to a temperature of 205° C. The dwell time was 2 minutes under a force of 16,000 lb$_f$. The composition of the resulting films is set forth below in Table 5.

TABLE 5

Three-Layered Film Compositions

| Ex. | 1$^{st}$ Outer Layer | 2$^{nd}$ Outer Layer | Core Layer |
|---|---|---|---|
| 8 | Ex. 4 (LLDPE) | Ex. 4 (LLDPE) | Ex. 1 (PHA/LLDPE) |
| 9 | Ex. 4 (LLDPE) | Ex. 4 (LLDPE) | Ex. 2 (PBS/LLDPE) |
| 10 | Ex. 4 (LLDPE) | Ex. 4 (LLDPE) | Ex. 3 (PHBV/LLDPE) |
| 11 | Ex. 4 (LLDPE) | Ex. 4 (LLDPE) | Ex. 5 (PLA/LLDPE) |
| 12 | Ex. 4 (LLDPE) | Ex. 4 (LLDPE) | Ex. 6 (PLA/LLDPE) |
| 13 | Ex. 7 (TPS/LLDPE) | Ex. 7 (TPS/LLDPE) | Ex. 1 (PHA/LLDPE) |
| 14 | Ex. 7 (TPS/LLDPE) | Ex. 7 (TPS/LLDPE) | Ex. 2 (PBS/LLDPE) |
| 15 | Ex. 7 (TPS/LLDPE) | Ex. 7 (TPS/LLDPE) | Ex. 3 (PHBV/LLDPE) |
| 16 | Ex. 7 (TPS/LLDPE) | Ex. 7 (TPS/LLDPE) | Ex. 6 (PLA/LLDPE) |
| 17 | Ex. 7 (TPS/LLDPE) | Ex. 4 (LLDPE) | Ex. 1 (PHA/LLDPE) |

The MD and CD tensile properties of the films of Examples 8-17 were determined as described above. The results are set forth below in Tables 6-7

TABLE 6

MD Tensile Properties

| Ex. | Thickness (microns) | Peak Load (gf) | Peak Stress (MPa) | Strain @ Break (%) | Modulus (MPa) | Break Stress (MPa) | Energy per Volume @ Break (J/cm$^3$) |
|---|---|---|---|---|---|---|---|
| 8 | 102.1 | 1017 | 33 | 536 | 107 | 32 | 88 |
| 9 | 98.3 | 1287 | 43 | 502 | 131 | 43 | 112 |
| 10 | 77.7 | 1130 | 47 | 511 | 168 | 47 | 122 |
| 11 | 85.6 | 702 | 27 | 497 | 314 | 14 | 66 |
| 12 | 151.1 | 1163 | 25 | 498 | 125 | 25 | 77 |
| 13 | 71.6 | 563 | 26 | 310 | 140 | 26 | 56 |
| 14 | 81.3 | 619 | 25 | 437 | 177 | 19 | 77 |
| 15 | 108.2 | 660 | 20 | 425 | 206 | 17 | 67 |
| 16 | 87.4 | 605 | 23 | 250 | 207 | 13 | 43 |
| 17 | 81.3 | 563 | 23 | 476 | 126 | 17 | 70 |

TABLE 7

CD Tensile Properties

| Ex. | Thickness (mil) | Peak Load (gf) | Peak Stress (MPa) | Strain @ Break (%) | Modulus (MPa) | Break Stress (MPa) | Energy per Volume @ Break (J/cm$^3$) |
|---|---|---|---|---|---|---|---|
| 8 | 4.22 | 488 | 15 | 793 | 94 | 15 | 65 |
| 9 | 3.76 | 587 | 20 | 784 | 158 | 20 | 94 |
| 10 | 3.08 | 494 | 21 | 821 | 164 | 21 | 99 |
| 11 | 3.88 | 391 | 13 | 885 | 198 | 8 | 63 |
| 12 | 5.93 | 502 | 11 | 973 | 137 | 7 | 58 |
| 13 | 3.76 | 310 | 11 | 639 | 159 | 10 | 47 |
| 14 | 3.07 | 262 | 11 | 464 | 201 | 11 | 42 |
| 15 | 2.94 | 171 | 8 | 412 | 177 | 3 | 22 |
| 16 | 3.17 | 202 | 8 | 546 | 185 | 6 | 36 |
| 17 | 3.14 | 446 | 18 | 793 | 179 | 18 | 89 |

As indicated above, relatively brittle biodegradable polyesters were employed in the core layer, yet the resulting film was still processable and possessed good mechanical properties and much better than the Control Examples 1 and 2. Example 8, for instance, contained PHA in the core layer. Surprisingly, the film still achieved a peak stress of 33 MPa in the machine direction and a strain at break of about 540% in the machine direction. Example 10 likewise shows another film containing PHBV in the core layer. Although PHBV is a brittle and stiff polymer, the resulting film also had good ductility (strain at break of 511% in MD), low stiffness (modulus of 168 MPa in MD), and high tensile peak stress (47 MPa in MD) due to the presence of the polyolefin in the core layer and outer layers. Examples 11-12 had PLA in the core layer. Once again, although PLA is a stiff and brittle polymer with low ductility, the films were quite ductile, with relatively high strain at break and low modulus of elasticity values. The films also had an outer surface with good heat sealing properties and printability due to the presence of a large amount of polyolefins (50%-100%) in the outer layer, which is important when used for packaging films.

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A multi-layered film having a thickness of about 250 micrometers or less, the film comprising:
   a first outer layer that contains about 50 wt. % or more of at least one polyolefin;
   a second outer layer that contains about 50 wt. % or more of at least one polyolefin,
   wherein the first outer layer, the second outer layer, or both contain a starch polymer and wherein the first outer layer and the second outer layer form outer surfaces of the film; and
   a core layer that is positioned between the first and second outer layers, wherein the core layer constitutes from about 20% to about 90% of the thickness of the film, wherein the core layer contains from about 10 wt. % to about 95 wt. % of at least one thermoplastic biopolymer and from about 5 wt. % to about 90 wt. % of at least one polyolefin, wherein the polyolefin of the core layer is not a functionalized or modified polyolefin, and
   wherein the multi-layered film has a modulus of elasticity in the machine direction of from about 50 Megapascals to about 600 Megapascals.

2. The multi-layered film of claim 1, wherein the thermoplastic biopolymer is an agro-derived or bio-based aliphatic polyester.

3. The multi-layered film of claim 2, wherein the aliphatic polyester is a polylactic acid, polyhydroxyalkanoate, polyalkylene succinate, or a combination thereof.

4. The multi-layered film of claim 2, wherein the agro-derived aliphatic polyester has a glass transition temperature of about 0° C. or more.

5. The multi-layered film of claim 1, wherein the polyolefin of the core layer, the first outer layer, the second outer layer, or a combination thereof is a copolymer of an α-olefin and ethylene.

6. The multi-layered film of claim 1, wherein the film exhibits a percent strain at break in the machine direction of about 200% or more and a percent strain at break in the cross-machine direction of about 300% or more.

7. The multi-layered film of claim 1, wherein the film exhibits a modulus of elasticity in the cross-machine direction of from about 50 to about 600 Megapascals.

8. The multi-layered film of claim 1, wherein the polyolefin of the outer layer is linear low density polyethylene.

9. The multi-layered film of claim 1, wherein the starch polymer is a hydroxyalkyl starch polymer.

10. The multi-layered film of claim 1, wherein the core layer is free of a plasticizer.

11. A multi-layered film having a thickness of about 250 micrometers or less, the film comprising:
    a first outer layer that contains 60 wt. % or more of at least one polyolefin, wherein the first outer layer forms a first outer surface of the film;
    a second outer layer that contains 60 wt. % or more of at least one polyolefin, wherein the second outer layer forms a second outer surface of the film;
    a core layer that is positioned between the first outer layer and the second outer layer, wherein the core layer constitutes from about 20% to about 90% of the thickness of the film, wherein the core layer contains from about 10 wt. % to about 95 wt. % of at least one thermoplastic biopolymer and from about 5 wt. % to about 90 wt. % of at least one polyolefin, wherein the polyolefin of the core layer is not a functionalized or modified polyolefin.

12. The multi-layered film of claim 11, wherein the first outer layer, the second outer layer, or a combination thereof contain an 50 wt. % or less of at least one additional polymer.

13. The multi-layered film of claim 12, wherein the at least one additional polymer is a starch polymer.

14. The multi-layered film of claim 13, wherein the starch polymer is a hydroxyalkyl starch polymer.

15. The multi-layered film of claim 11, wherein the thermoplastic biopolymer is a polylactic acid, polyhydroxyalkanoate, polyalkylene succinate, or a combination thereof.

16. The multi-layered film of claim 11, wherein the polyolefin of the core layer, the first outer layer, the second outer layer, or a combination thereof is a copolymer of an α-olefin and ethylene.

17. The multi-layered film of claim 11, wherein the polyolefin of the first outer layer, the second outer layer, or a combination thereof is linear low density polyethylene.

* * * * *